United States Patent
Kovnat et al.

(10) Patent No.: US 7,495,791 B2
(45) Date of Patent: Feb. 24, 2009

(54) LOAD SHARING AMONG NETWORKED IMAGE PROCESSING DEVICES

(75) Inventors: Larry A. Kovnat, Rochester, NY (US); David Birnbaum, Greensboro, NC (US)

(73) Assignee: Xerox Corporation, Norwalk, CT (US)

( * ) Notice: Subject to any disclaimer, the term of this patent is extended or adjusted under 35 U.S.C. 154(b) by 875 days.

(21) Appl. No.: 10/959,477

(22) Filed: Oct. 6, 2004

(65) Prior Publication Data
US 2006/0072148 A1 Apr. 6, 2006

(51) Int. Cl.
G06F 3/12 (2006.01)
G06K 15/00 (2006.01)

(52) U.S. Cl. .................. 358/1.15; 358/1.13

(58) Field of Classification Search .............. 358/1.51, 358/1.1, 1.2, 1.4, 1.6, 1.9, 1.11, 1.13, 1.14, 358/1.15, 1.16, 1.17, 1.18, 407, 400, 401, 358/468, 450; 347/129, 112, 111, 2, 3, 5; 382/302, 303, 304; 715/209, 274, 277, 276; 399/1, 2, 6, 8, 407

See application file for complete search history.

(56) References Cited

U.S. PATENT DOCUMENTS

| | | | |
|---|---|---|---|
| 5,819,014 A | 10/1998 | Cyr et al. | |
| 2002/0118387 A1* | 8/2002 | Patton | 358/1.15 |
| 2002/0149799 A1* | 10/2002 | Hayashi | 358/406 |
| 2004/0136028 A1 | 7/2004 | Rabb | |

OTHER PUBLICATIONS

Adobe PostScript Extreme, 1998 Adobe Systems Incorporated, BC1218 Aug. 1998 (8 pages).

* cited by examiner

Primary Examiner—Dov Popovici
(74) Attorney, Agent, or Firm—Fay Sharpe LLP

(57) ABSTRACT

A networked environment for sharing an image processing load for a rendering job and associated method is disclosed. In one embodiment, the networked environment includes: an image source device, a first image processing device, a network for data communications, and a second image processing device. The second image processing device is spaced apart from the first image processing device. The first image processing device includes a first image processing resource and a rendering resource. The second image processing device includes a second image processing resource. The first image processing device receives a rendering job from the image source device for rendering. The rendering job requires image processing prior to such rendering. A portion of the image processing required for the rendering job is performed by the second image processing resource. The rendering resource renders the rendering job when image processing is complete.

21 Claims, 8 Drawing Sheets

LOAD SHARING AMONG NETWORKED IMAGE PROCESSING DEVICES

CROSS-REFERENCE TO RELATED APPLICATIONS

This application is related to Rabb, patent application Ser. No. 10/345,438, entitled "Method and System for Workload Balancing," filed Jan. 15, 2003, commonly assigned to Xerox Corp. and incorporated by reference herein. The Rabb application was published on Jul. 15, 2004 as Pub. No. 2004/0136028.

This application is related to Klassen et al., patent application Ser. No. 10/407,564, entitled "Parallel Printing System," filed Apr. 4, 2003, commonly assigned to Xerox Corp. and incorporated by reference herein.

BACKGROUND

The embodiments disclosed herein relate to sharing the image processing load for a rendering job directed to a target image processing device among interconnected or networked image processing devices. It finds particular application in conjunction with a networked office environment, and will be described with particular reference thereto. However, it is to be appreciated that the present exemplary embodiment is also amenable to other like applications.

In customer installations with networked devices, some image processing devices may be heavily loaded while others are relatively idle. It is desirable to have a method to balance the processing load among the image processing devices. This load balancing would be more advantageous if it could be done without human intervention and with a goal of optimally utilizing the available processing power.

For example, high speed color multifunction (e.g., printer, copier, facsimile, and scanner) devices can have a problem printing large color documents at the rated speed of the device. Production devices can deal with this problem by devoting multiple computers to the job of converting the printer description language (PDL) version of the document into printer ready rasters. However, for networked office machines this multiple central processing unit (CPU) approach is not usually cost effective.

BRIEF DESCRIPTION

In one aspect, a networked environment for sharing an image processing load for a rendering job is disclosed. In one exemplary embodiment, the networked environment includes: an image source device, a first image processing device with a first image processing resource and a rendering resource, wherein the first image processing device receives a rendering job from the image source device for rendering by the rendering resource, wherein the rendering job requires image processing prior to such rendering, a network for data communications, and a second image processing device with a second image processing resource in communication with the first image processing device via the network, wherein the second image processing device is spaced apart from the first image processing device. At least a portion of the image processing required for the rendering job is performed by the second image processing resource. The rendering resource renders the rendering job when image processing for the rendering job is complete.

In another aspect, a method of sharing an image processing load for a rendering job in a networked environment is disclosed. In one exemplary embodiment, the method includes: a) providing an image source device, a first image processing device, and a second image processing device, the first image processing device including a first image processing resource and a rendering resource, the second image processing device including a second image processing resource, wherein the second image processing device is spaced apart from the first image processing device, wherein the image source device is in communication with at least the first image processing device, wherein at least the first and second image processing devices are in communication via a network, b) receiving a rendering job for rendering at the first image processing device from the image source device, wherein the rendering job requires image processing prior to such rendering, c) performing at least a portion of the image processing required for the rendering job at the second image processing resource, and d) rendering the rendering job at the rendering resource when image processing for the rendering job is complete.

In still another aspect, a networked environment for sharing an image processing load for a rendering job on a xerographic rendering resource is provided. In one embodiment, the networked environment includes: an image source device, a first image processing device with a first image processing resource and a xerographic rendering resource, wherein the first image processing device receives a rendering job from the image source device for rendering by the xerographic rendering resource, wherein the rendering job requires image processing prior to such rendering, a network for data communications, and a second image processing device with a second image processing resource in communication with the first image processing device via the network, wherein the second image processing device is spaced apart from the first image processing device. At least a portion of the image processing required for the rendering job is performed by the second image processing resource. The xerographic rendering resource renders the rendering job when image processing for the rendering job is complete.

DETAILED DESCRIPTION

Figure 1:
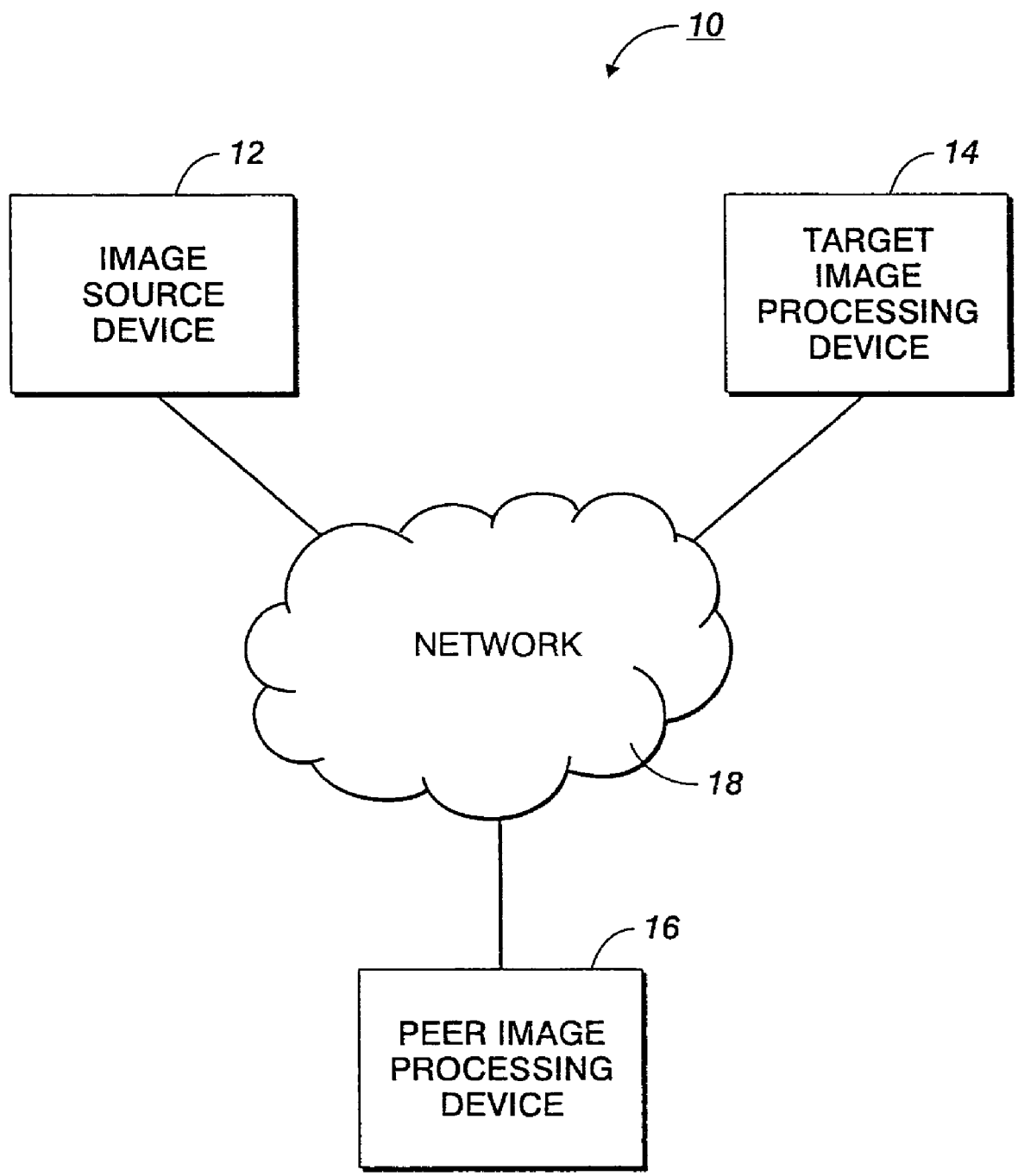
FIG. 1 is a block diagram of an embodiment of a network environment with multiple image processing devices.

In general, the exemplary embodiments described herein provide an autonomous system that allows multiple networked image processing devices to share image processing loads for rendering jobs. The sharing is accomplished dynamically, without user intervention. The image processing load, for example, refers to the various steps involved in processing images associated with a given rendering job. When sharing the image processing loads in the exemplary embodiments, a processed output for the rendering job is ultimately collected by the physical or target device originally intended by the user. Upon initially receiving the rendering job, the target device may examine its own queue to determine if a backlog is developing. If so, the target device may broadcast a request for service or assistance to other image processing devices within its network environment. The request may indicate the type of service required (e.g., PostScript, printer control language (PCL), decompression, rotation, color conversion, etc.). A peer image processing device, after considering its own image processing load, can accept the requested image processing service. The image processing for the entire rendering job, a portion of the rendering job, or a particular type of image processing may be transferred to the accepting peer device. The requestor's queue may be marked with the remote peer device's address and with an indication that image processing for at least a portion of the rendering job is being performed at the remote peer device. When image processing is complete at the accepting peer device, for example, processed data is transferred back to the requestor for rendering or continued image processing.

For example, each networked image processing device will periodically examine its queue to determine its processing load. If a first image processing device determines that a backlog is developing, this device will select, for example, a suitable rendering job and broadcast a request for image processing help to its network neighbors. The neighbors, for example, may include other networked image processing devices. The request for help also may include certain parameters of the selected job. Neighbor devices may examine the broadcasted request and, based on their load factor, choose to respond or ignore the request for help. This scheme limits network traffic because the broadcast from the requesting device is made infrequently and neighbors only respond if they are offering to help. The scheme does not require a server database that would have to be periodically updated with the status of devices on the network.

If a response to the request for help is received, the requestor and the responder establish direct communications. The requestor transfers image processing for the rendering job, a portion thereof, or a particular type of image processing to the responder. The requestor marks its queue with the responder's identity. If a user checks the queue for the requester, they may see the rendering job in its normal order in the queue with an indication that at least some image processing for the rendering job is being performed at a remote peer image processing device. The responder receives input data associated with the rendering job for image processing, schedules it, processes it, and returns processed data to the requestor. The form of the processed data can be negotiated at the initiation of the transaction. For example, the data could be in the form of uncompressed rasters, run-length encoded rasters, band lists, or any suitable form that is agreed upon by the two devices. This negotiation may take place in a hierarchical fashion with, for example, preference given to compressed forms in order to reduce network traffic. However, even if the data is transferred in raw form, the network load is minimized because raw form transfers would use efficient packets (i.e., the ratio of payload to overhead will be high for most packets). The requestor receives, for example, the processed data and schedules it for production in the same manner as if the image processing had taken place locally.

This scheme may be implemented, for example, on image processing devices that have embedded web servers. Request messages may utilize http. The same facility may be implemented at all networked image processing devices, thus preserving network coherence. The facility can be enabled or disabled. The facility can be enabled to ask for help under certain conditions, to respond to requests for help under certain conditions, or both.

An advantage of this scheme is that image processing load sharing takes place dynamically and autonomously. Another advantage is that the networked image processing devices communicate as peers. Thus, a server is not required, no policies need to be established, devices do not need to be grouped before the facility is enabled, and network management is not required. Still another advantage is that the facility may be provided in image processing devices with an embedded web server.

Under this scheme, a faulted device can still respond to requests for image processing load sharing from its neighbors. The scheme is adaptable and robust to changing network conditions. Output for the job is delivered at the device originally intended by the user. The system described herein may be implemented in multifunction devices, printers, copiers, fax machines, and/or scanners.

In another aspect, the image processing devices (e.g., multifunction devices) may include a control computer that is essentially equivalent to a typical mid-range office desktop computer and may use a Unix-like (e.g. Linux) operating system. In one embodiment, the image processing system includes software elements that allow a multi-page PostScript document to be broken down into separate pages and additional software elements that use the operating system communication facilities to distribute the individual pages to other image processing devices within the network environment for image processing. This allows, for example, idle image processing devices within the network environment to contribute their computing or processing resources to a rendering job sent to a target device and provide a significant improvement in overall throughput on the target device. While PostScript is identified as an exemplary language for the document, in other embodiments, other forms of PDL, such as PCL may be the language in which the rendering job is presented to the target device.

This takes advantage of techniques for page parallel speedup of PostScript printing by distributing decomposition of multi-page PostScript jobs to multiple independent computers. For example, certain page parallel techniques are disclosed in Klassen et al., patent application Ser. No. 10/407, 564 which is incorporated herein by reference. This also takes advantage of the use of a Unix-like operating system in most modern image processing devices (e.g., multifunction devices). It further takes advantage of typical conditions in office environments with multiple networked image processing devices where many of the devices may be idle for a significant portion of the day.

In one embodiment, the target image processing device may include four components generically referred to as the first, second, third, and fourth software components. The first software component, for example, decomposes a multi-page PostScript rendering job into a series of individual PostScript image processing jobs, one per page of the document. Alternatively, the first component may be a hardware component or a combination of hardware and software. The second software component, for example, allows the underlying operating system to communicate with other networked image processing devices. Alternatively, the second component may be a hardware component or a combination of hardware and software. The third software component, for example, is part of the job scheduling and communication part of the network controller portion of the device controller and can communicate requests to the other networked image processing devices for assistance. The third component may also respond to such requests from the other networked image processing devices. Alternatively, the third component may be a hardware component or a combination of hardware and software. The fourth software component, for example, is optional and compresses data streams that are sent out to other networked image processing devices to minimize bandwidth demands on the network. Alternatively, the fourth component may be a hardware component or a combination of hardware and software.

In the embodiment being described, a multi-page PostScript rendering job may be identified as such by the first component. The first component may also estimate the demand the particular rendering job would make on the local image processing resources of the target image processing device. If the demand does not exceed a predetermined level, the target device just proceeds to process the job locally. However, if the demand exceeds this level, it is presumed there would be a reduction in overall throughput on the target device and a request may be made to the third component to use the second component to broadcast a request on the network to peer devices (i.e., image processing devices or any other type of computer device able to communicate with the target device via the network) calling for a response from peer devices that are idle (or experiencing limited demand for image processing resources) and could assist in providing image processing services for the rendering job. The third component may build a list of such peer devices and send individual pages to some selected set of these peer devices, possibly compressing the PostScript data stream using the fourth component. As each peer device processes the pages it received, it may, optionally, compress them using its own fourth component and send the processed data back to the requesting target device. The target device may assemble the individual pages into a single document or output data stream for rendering.

In another embodiment, the peer device(s) may communicate some measure of its capability (e.g., relative CPU power) along with its availability to assist the target device. This information may be used by the requesting machine to make decisions about which of many peer devices to use or the order of devices to which it sends image processing jobs for page processing.

With reference to FIG. 1, an embodiment of a networked environment 10 includes an image source device 12, a target image processing device 14, and a peer image processing device 16 in communication via a network 18. The image source device 12 may include, for example, an office computer or work station, a file server, disk drive, or other type of storage device, a scanner, or a facsimile machine. There may be a plurality of image source devices 12 in the network environment 10. Nevertheless, the image source device 12 may be optional if an image source device is included in the target image processing device 14. The target image processing device 14 may include, for example, a printer, a copier, a facsimile machine, a scanner, or a combination of one or more of these devices (i.e., a multifunction device). Likewise, the peer image processing device 16 may include, for example, a printer, a copier, a facsimile machine, a scanner, or a combination of one or more of these devices (i.e., a multifunction device). Additionally, the peer image processing device 16 may be any type of computer resource with image processing capabilities, such as a desktop computer, a notebook computer, a server, etc. There may be a plurality of peer image processing devices 16 in the network environment 10. The network 18 may include any combination of local area networks (LANs), wide area networks (WANs), metropolitan area networks (MANs), and other types of communication networks suitable for data communication, including the Internet. The network 18 may include wired or wireless networks. The network 18 may include any combination of network technologies, such as computer networks, telephone switching networks, mobile telephone networks, the Internet, satellite communication networks, and other types of communication networks suitable for data communication.

For purposes of this description, a rendering job is created by the image source device 12 for rendering by the target image processing device 14. The rendering job is defined, for example, in a PDL data stream from the image source device 12 to the target image processing device 14. In order to improve throughput, the target image processing device 14 may request image processing assistance for the rendering job from any peer image processing device 16. If any peer image processing device 16 responds or otherwise accepts the request, the target image processing device 14 sends the rendering job or a portion thereof to one or more peer image processing devices 16 for image processing or a portion thereof. When the peer image processing device 16 is finished with the image processing task, the resulting data is communicated to the target image processing device 14 in a processed data stream. The communications between the target and peer devices may be compressed prior to transmission and de-compressed upon receipt in order to reduce network traffic.

Peer image processing devices 16 with rendering resources may serve as a target device and may include the functions described herein for the target image processing device 14. Likewise, the target image processing device 14 may serve as a peer device when any peer device is functioning as a target device and may include the functions described herein for the peer image processing device 16.

Additionally, in another embodiment, the target image processing device 14 may be a xerographic device. In other words, the target device may include xerographic rendering resources. The peer image processing device 16 may also be a xerographic device, but this is not necessary for sharing the target device's image processing load with the peer device.

Figure 2:
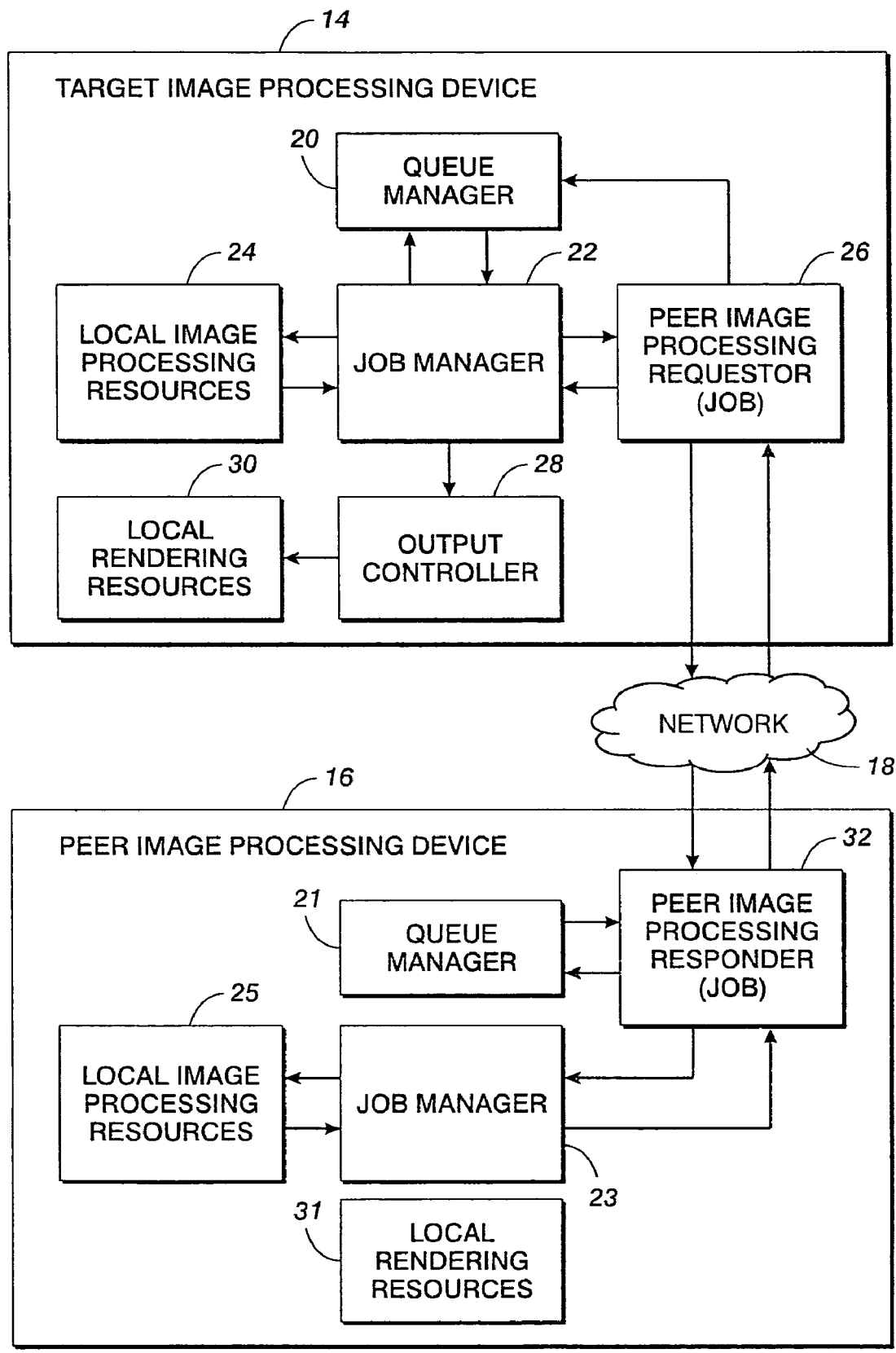
FIG. 2 is a block diagram of an embodiment of a target image processing device in communication with a corresponding embodiment of a peer image processing device via a network.

With reference to FIG. 2, an embodiment of the target image processing device 14 includes a queue manager 20, a job manager 22, local image processing resources 24, a peer image processing requestor 26, an output controller 28, and local rendering resources 30. An embodiment of the peer image processing device 16 includes a queue manager 21, a job manager 23, local image processing resources 25, local rendering resources 31, and a peer image processing responder 32. As can be seen below, the local rendering resources 31 are not required when the peer device 16 is providing image processing assistance to the target device 14. Rather, the local rendering resources 31 may be used when the peer device 16 is selected as a target device for a given rendering job. Since the local rendering resources 31 are not required to implement the concept of shared image processing, the peer device 16 may include any type of computer resource with local image processing resources 25 capable of communicating with the target device 14 via the network 18.

When the target device 14 receives a rendering job, the job is placed in a queue which is managed by the queue manager 20. The queue manager 20 passes the rendering job to the job manager 22. The job manager 22 is in communication with the queue manager 20 and can determine when a backlog is developing and when it would be more efficient if image processing for a given rendering job could be delegated to another device. If such conditions are determined, the job manager 22 notifies the requester 26 of the rendering job for which it prefers to delegate image processing. Various characteristics and parameters associated with the rendering job, such as the language (e.g., PCL, PostScript), size, and resolution, may be provided to the requester 26. The requestor 26 broadcasts a request for image processing on this rendering job to peer image processing devices 16 via the network 18. Various characteristics and parameters associated with the image processing for the rendering job, such as the priority, language, size, and resolution, may be identified in the broadcasted request.

The responder 32 in the peer device 16 receives the broadcasted request and checks the status of the peer device 16 by communicating with the queue manager 21. If the peer device 16 can assign local resources 25 to perform the requested image processing, the responder 32 sends a response indicating such to the requestor 26 and the queue manager 21. Various characteristics and parameters associated with the peer device 16, such as CPU type, estimated time to complete, and image processing services available, may be included in the response to the requestor 26.

The requestor 26 may evaluate multiple responses and select a peer device 16 that optimizes throughput/efficiency and/or image processing quality for the target device 14. Of course, the requestor 26 may also simply act on the first response to the broadcasted request. Once a peer device 16 is selected, the requestor 26 communicates the selection to the queue manager 20 and job manager 22. The queue manager 20 may associate the delegated image processing for the rendering job with the selected peer device 16. The job manager 22 passes the image processing for the rendering job to the selected peer device 16 via the requestor 26 and the network 18 as an image processing job in a data stream. The requestor 26 may compress the data stream to reduce network traffic.

The responder 32 in the selected peer device 16 receives the image processing job and decompresses the data stream if it was compressed. The responder 32 notifies the queue manager 21 that the image processing job was received and passes the image processing job to the job manager 23. The job manager 23 determines which local resources 25 are required to process the image processing job and routes the image processing job to the appropriate resources. When the image processing job is complete, the job manager 23 sends processed data to the target device 14 via the responder 32 and network 18 in a data stream. The responder 32 may compress the processed data to reduce network traffic.

The requestor 26 receives the processed data and decompresses the data stream if it was compressed. The requestor 26 notifies the queue manager 20 that the processed data was received and passes the processed data to the job manager 22. The job manager 22 coordinates the processed data for the rendering job with other rendering jobs in the target device queue and, at an appropriate time, routes the processed rendering job to the output controller 28 for rendering by the local rendering resources 30. For example, if the rendering job is a print job, the local rendering resources include a print engine and a marking apparatus and the rendering job is rendered to some form of print media (e.g., paper).

Notably, if the job manager 22 does not attempt to delegate image processing for the rendering job or if no peer device 16 responds to the request for image processing assistance, the job manager 22 coordinates image processing for the rendering job with image processing for other rendering jobs and eventually passes the data associated with the rendering job to the local resources 24 for image processing. The data associated with the rendering job may be passed back and forth between the job manager 22 and the local resources 24 multiple times as various types or stages of image processing for the rendering job are performed. When image processing for the rendering job is complete, the local resources 24 send the processed data back to the job manager 22. Then, at an appropriate time, the job manager 22 routes the processed rendering job to the local rendering resources 30 via the output controller 28 as described above.

Figure 3:
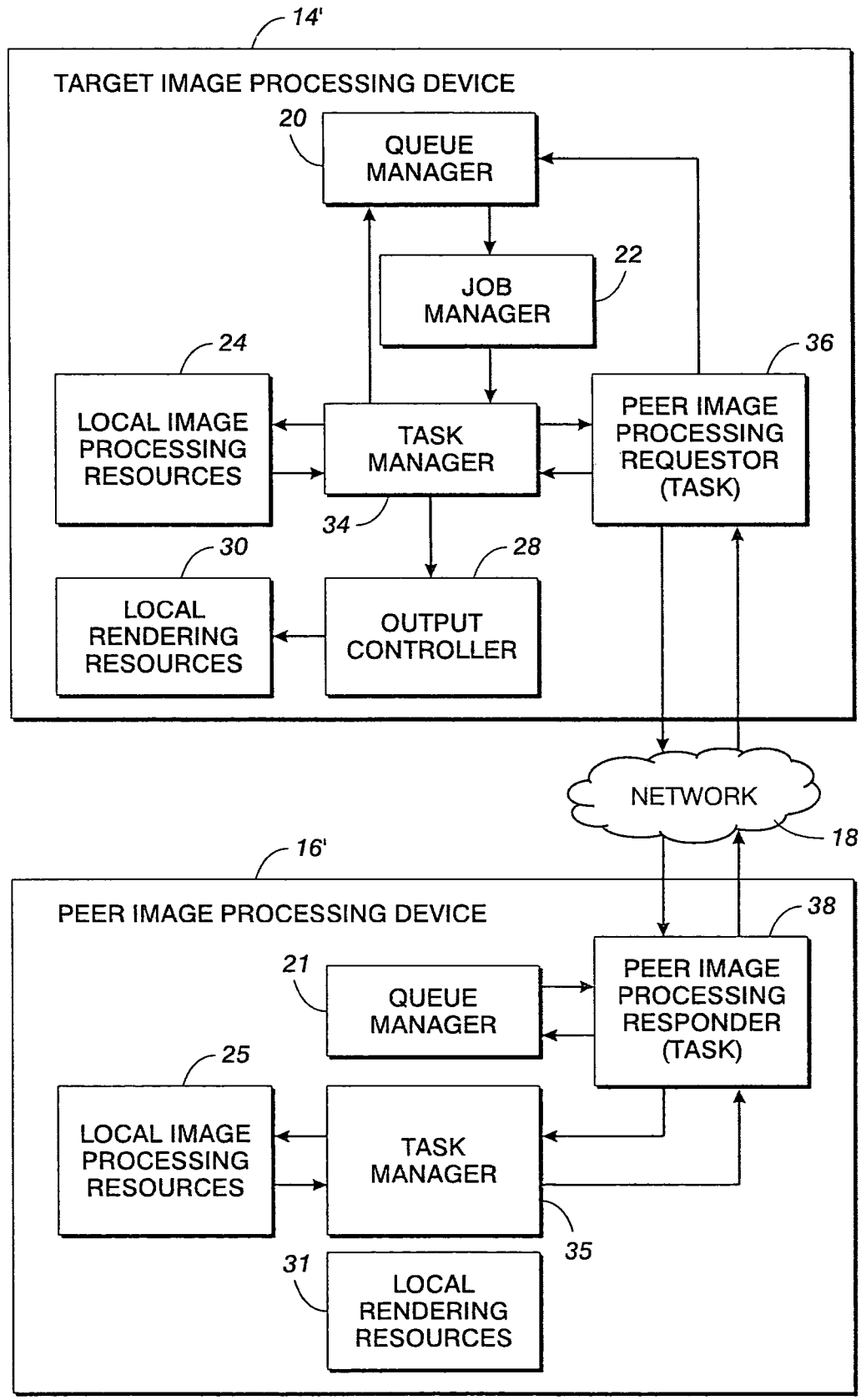
FIG. 3 is a block diagram of another embodiment of a target image processing device in communication with a corresponding embodiment of a peer image processing device via a network.

With reference to FIG. 3, another embodiment of the target image processing device 14' includes the queue manager 20, job manager 22, local image processing resources 24, output controller 28, local rendering resources 30, a task manager 34, and a peer image processing requestor 36. Another embodiment of the peer image processing device 16' includes the queue manager 21, local image processing resources 25, local rendering resources 31, a task manager 35, and a peer image processing responder 38. Like the embodiment described above with reference to FIG. 2, the local rendering resources 31 are not required when the peer device 16' is providing image processing assistance to the target device 14', but may be used when the peer device 16' is selected as a target device for a given rendering job. Since the local rendering resources 31 are not required to implement the concept of shared image processing, the peer device 16' may include any type of computer resource with local image processing resources 25 capable of communicating with the target device 14' via the network 18.

In other respects, the general configuration and operation of this embodiment is similar to the embodiment described above with reference to FIG. 2. However, in the embodiment of FIG. 3 the job manager 22 passes the rendering job to the task manager 34. The task manager 34 can split image processing for the rendering job into independent image processing tasks. Each image processing task can be independently managed as an image processing job by the task manager 34. Thus, decisions regarding delegation to peer devices 16' can be made at the task level. This includes pre-processing tasks as well as image processing tasks. For example, various color conversion, rotation, scaling, de-screening, half-toning, filtering, background suppression, transformation, interpolation, smoothing, averaging, edge detection, sharpening, line thinning, edge filling, and restoration tasks may be managed independently. Moreover, where it may be logical or practical to delegate a group of image processing tasks or the remaining image processing tasks to the same peer device 16', the task manager 34 may take this into account or may define independent image processing jobs for such groups rather than individual tasks.

The task manager 34 is in communication with the queue manager 20 and can determine when a backlog is developing and when it would be more efficient if a given image processing job could be delegated to another device. If such conditions are determined, the task manager 34 notifies the requestor 36 of the image processing job for which it prefers to delegate image processing. Various characteristics and parameters associated with the image processing job may be provided to the requestor 36. The requestor 36 broadcasts a request for image processing associated with the image processing job to peer image processing devices 16' via the network 18. Various characteristics and parameters associated with the image processing job may be identified in the broadcasted request.

The responder 38 in the peer device 16' receives the broadcasted request and checks the status of the peer device 16' by communicating with the queue manager 21. If the peer device 16' can assign local resources 25 to perform the requested image processing, the responder 32 sends a response indicating such to the requestor 36 and the queue manager 21. Various characteristics and parameters associated with the peer device 16' may be included in the response to the requestor 36.

The requester 36 may evaluate multiple responses and select a peer device 16' that optimizes throughput/efficiency and/or image processing quality for the target device 14'. Of course, the requester 36 may also simply act on the first response to the broadcasted request. Once a peer device 16' is selected, the requestor 36 communicates the selection to the queue manager 20 and task manager 34. The queue manager 20 may associate the delegated image processing for the rendering job with the selected peer device 16'. The task manager 34 passes the image processing job to the selected peer device 16' via the requestor 36 and the network 18 in a data stream. The requester 36 may compress the data stream to reduce network traffic.

The responder 38 in the selected peer device 16' receives the image processing job and decompresses the data stream if it was compressed. The responder 38 notifies the queue manager 21 that the image processing job requiring certain image processing task(s) was received and passes the image processing job to the task manager 35. The task manager 35 determines which local resources 25 are required to process the image processing job and routes the image processing job to the appropriate resources. When the image processing job is complete, the task manager 35 sends processed data to the target device 14' via the responder 38 and network 18 in a data stream. The responder 38 may compress the data stream to reduce network traffic.

The requestor 36 receives the processed data and decompresses the data stream if it was compressed. The requestor 36 notifies the queue manager 20 that the processed data for the delegated portion of the rendering job was received and passes the processed data to the task manager 34. The task manager 34 coordinates the processed data with additional image processing tasks that may need to be performed for the rendering job. The delegation process may be repeated for any remaining image processing tasks or they may be assigned to the local resources 24. When image processing for the rendering job is complete, the task manager 34 coordinates the processed data for the rendering job with other rendering jobs in the target device queue and, at an appropriate time, routes the processed rendering job to the output controller 28 for rendering by the local rendering resources 30.

Notably, if the task manager 34 does not attempt to delegate a given image processing job for the rendering job or if no peer device 16' responds to the request for image processing assistance on a particular image processing job, the task manager 34 coordinates image processing for the image processing job with other image processing jobs associated with the rendering job and other rendering jobs and eventually passes the image processing job or all image processing for the rendering job to the local resources 24 for processing. The data associated with the rendering job may be passed back and forth between the task manager 34 and the local resources 24 multiple times as various image processing jobs associated with the rendering job are performed. When the assigned image processing job is complete, the local resources 24 send the corresponding processed data back to the task manager 34. The delegation process may be repeated for any remaining image processing jobs associated with the rendering job. When all image processing jobs associated with the rendering job are complete, at an appropriate time, the task manager 34 routes the processed rendering job to the local rendering resources 30 via the output controller 28 as described above.

Figure 4:
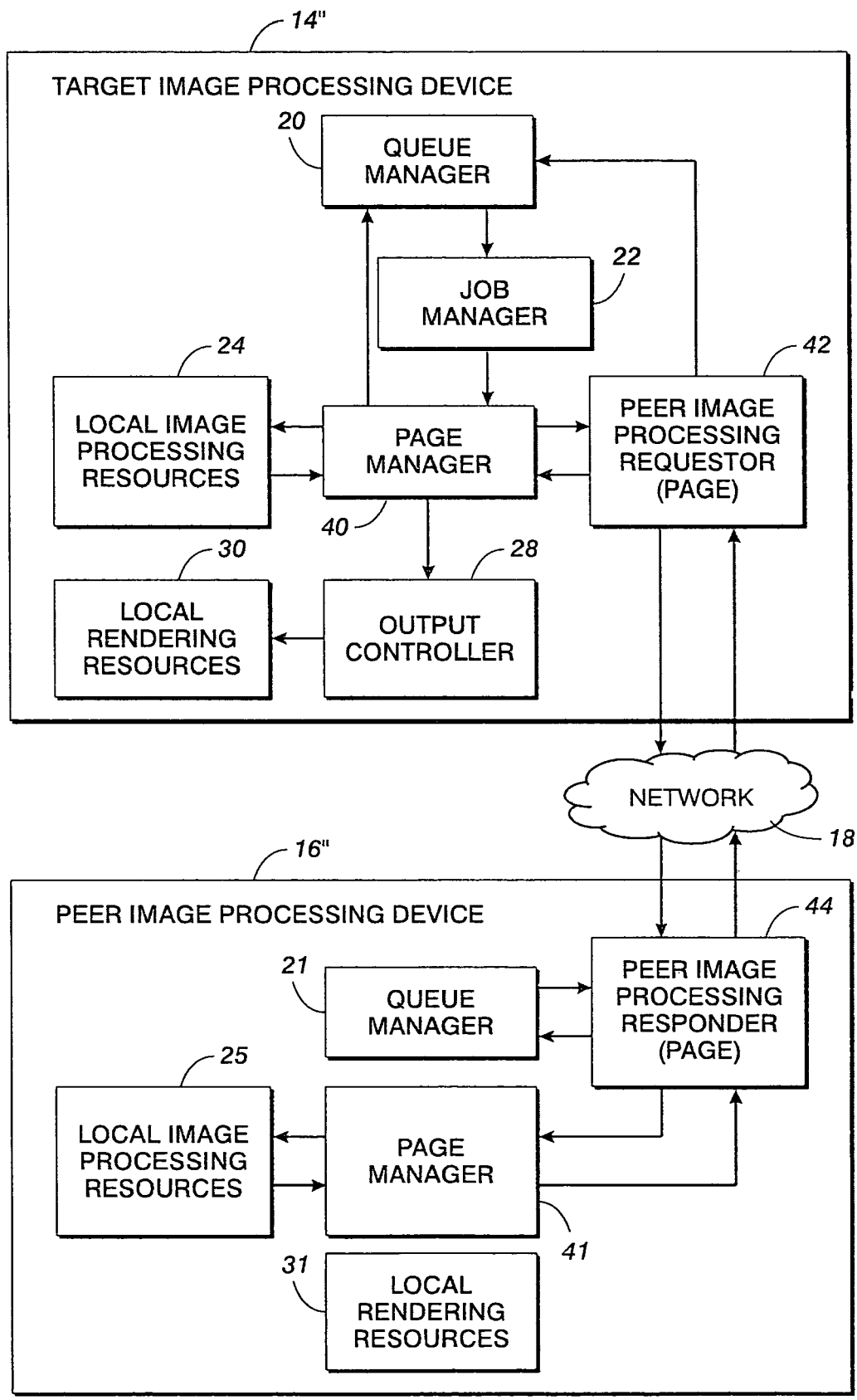
FIG. 4 is a block diagram of still another embodiment of a target image processing device in communication with a corresponding embodiment of a peer image processing device via a network.

With reference to FIG. 4, still another embodiment of the target image processing device 14" includes the queue manager 20, job manager 22, local image processing resources 24, output controller 28, local rendering resources 30, a page manager 40, and a peer image processing requestor 42. Still another embodiment of the peer image processing device 16" includes the queue manager 21, local image processing resources 25, local rendering resources 31, a page manager 41, and a peer image processing responder 44. Like the embodiment described above with reference to FIG. 2, the local rendering resources 31 are not required when the peer device 16" is providing image processing assistance to the target device 14", but may be used when the peer device 16" is selected as a target device for a given rendering job. Since the local rendering resources 31 are not required to implement the concept of shared image processing, the peer device 16" may include any type of computer resource with local image processing resources 25 capable of communicating with the target device 14" via the network 18.

In other respects, the general configuration and operation of this embodiment is similar to the embodiments described above with reference to FIGS. 2 and 3. However, in the embodiment of FIG. 4 the job manager 22 passes the rendering job to the page manager 40. The page manager 40 can split image processing for the rendering job into independent pages. Each page can be independently managed as an image processing job by the page manager 40. Thus, decisions regarding delegation to peer devices 16" can be made at the page level. Moreover, where it may be logical or practical to delegate a group of pages or the remaining pages to the same peer device 16", the page manager 40 may take this into account or may define independent image processing jobs for such groups rather than individual pages.

The page manager 40 is in communication with the queue manager 20 and can determine when a backlog is developing and when it would be more efficient if a given image processing job could be delegated to another device. If such conditions are determined, the page manager 40 notifies the requestor 42 of the image processing job for which it prefers to delegate image processing. Various characteristics and parameters associated with the image processing job may be provided to the requestor 42. The requester 42 broadcasts a request for image processing associated with the image processing job to peer image processing devices 16" via the network 18. Various characteristics and parameters associated with the page(s) may be identified in the broadcasted request.

The responder 44 in the peer device 16" receives the broadcasted request and checks the status of the peer device 16" by communicating with the queue manager 21. If the peer device 16" can assign local resources 25 to perform the requested image processing, the responder 44 sends a response indicating such to the requester 42 and the queue manager 21. Various characteristics and parameters associated with the peer device 16" may be included in the response to the requestor 42.

The requestor 42 may evaluate multiple responses and select a peer device 16" that optimizes throughput/efficiency and/or image processing quality for the target device 14". Of course, the requester 42 may also simply act on the first response to the broadcasted request. Once a peer device 16" is selected, the requestor 42 communicates the selection to the queue manager 20 and page manager 40. The queue manager 20 may associate the delegated page(s) for the rendering job with the selected peer device 16". The page manager 40 passes the image processing job to the selected peer device 16" via the requestor 42 and the network 18 in a data stream. The requester 42 may compress the data stream to reduce network traffic.

The responder 44 in the selected peer device 16" receives the image processing job and decompresses the data stream if it was compressed. The responder 44 notifies the queue manager 21 that the job requiring certain image processing task(s) was received and passes the image processing job to the page manager 41. The page manager 41 determines which local resources 25 are required to process the image processing job and routes the image processing job to the appropriate resources. When the image processing job is complete, the page manager 41 sends processed data to the target device 14" via the responder 44 and network 18 in a data stream. The responder 44 may compress the data stream to reduce network traffic.

The requestor 42 receives the processed data and decompresses the data stream if it was compressed. The requestor 42 notifies the queue manager 20 that the processed data for the delegated portion of the rendering job was received and passes the processed data to the page manager 40. The page manager 40 coordinates the processed data with additional image processing jobs that may need to be performed for the rendering job. The delegation process may be repeated for any remaining pages or they may be assigned to the local resources 24. When image processing for the rendering job is complete, the page manager 40 coordinates the processed data for the rendering job with other rendering jobs in the target device queue and, at an appropriate time, routes the processed rendering job to the output controller 28 for rendering by the local rendering resources 30.

Notably, if the page manager 40 does not attempt to delegate a given image processing job for the rendering job or if no peer device 16" responds to the request for image processing assistance on a particular image processing job, the page manager 40 coordinates image processing for the image processing job with other image processing jobs associated with the rendering job and eventually passes the image processing job or all image processing for the rendering job to the local resources 24 for processing. The data associated with the rendering job may be passed back and forth between the page manager 40 and the local resources 24 multiple times as various image processing jobs associated with the rendering job are performed. When the assigned image processing job is complete, the local resources 24 send the corresponding processed data back to the page manager 40. The delegation process may be repeated for any remaining image processing jobs associated with the rendering job. When all image processing jobs associated with the rendering job are complete, at an appropriate time, the page manager 40 routes the processed rendering job to the local rendering resources 30 via the output controller 28 as described above.

Figure 5:
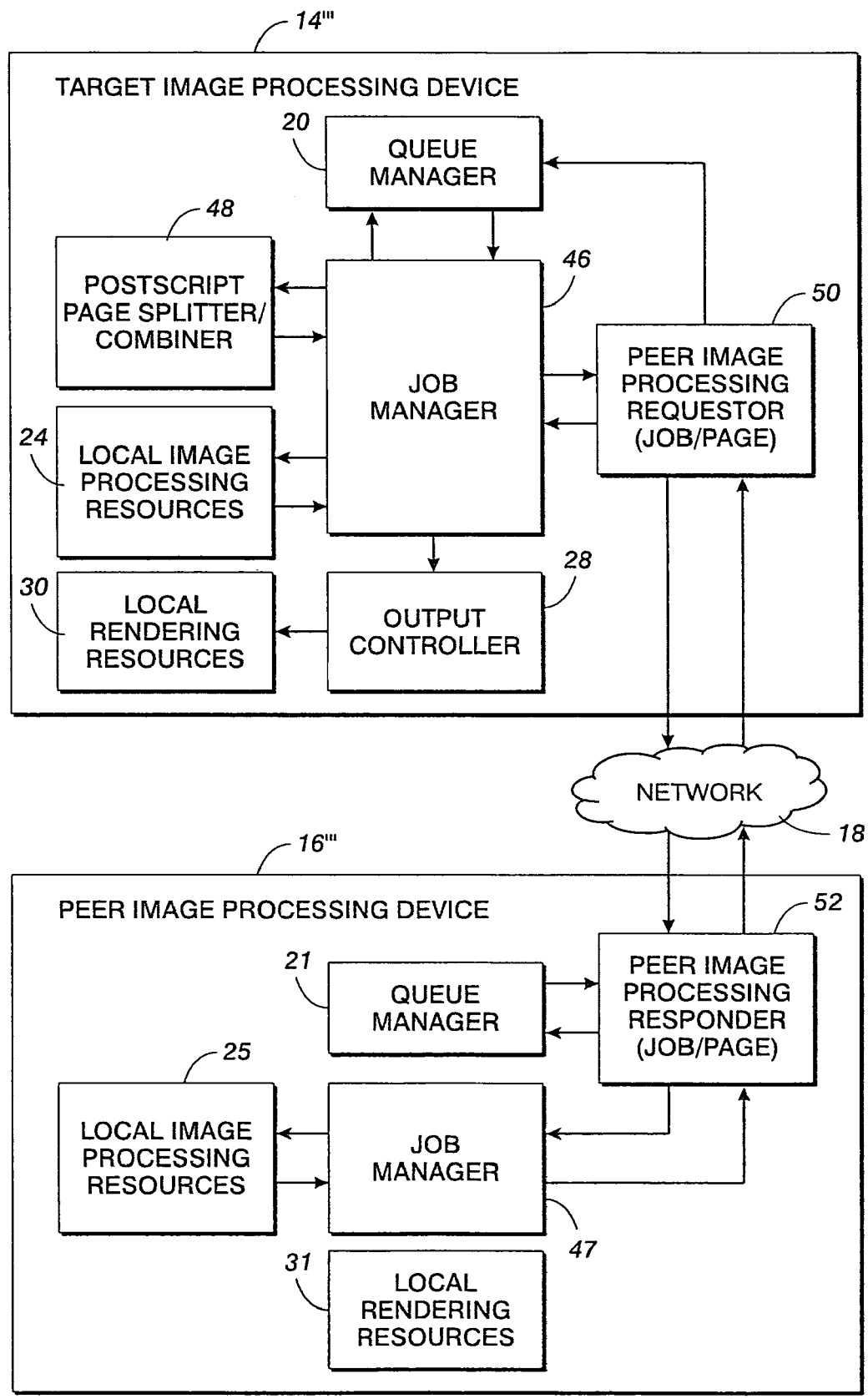
FIG. 5 is a block diagram of yet another embodiment of a target image processing device in communication with a corresponding embodiment of a peer image processing device via a network.

With reference to FIG. 5, yet another embodiment of the target image processing device 14'" includes the queue manager 20, local image processing resources 24, output controller 28, local rendering resources 30, a job manager 46, a PostScript page splitter/combiner 48, and a peer image processing requestor 50. Yet another embodiment of the peer image processing device 16'" includes the queue manager 21, local image processing resources 25, local rendering resources 31, a job manager 47, and a peer image processing responder 52. Like the embodiment described above with reference to FIG. 2, the local rendering resources 31 are not required when the peer device 16'" is providing image processing assistance to the target device 14'", but may be used when the peer device 16'" is selected as a target device for a given rendering job. Since the local rendering resources 31 are not required to implement the concept of shared image processing, the peer device 16'" may include any type of computer resource with local image processing resources 25 capable of communicating with the target device 14'" via the network 18.

In other respects, the general configuration and operation of this embodiment is similar to the embodiments described above with reference to FIGS. 2-4. However, in the embodiment of FIG. 5 the job manager 46 passes multi-page PostScript rendering jobs to the page splitter/combiner 48. The page splitter/combiner 48 can split image processing for the multi-page PostScript rendering job into independent pages. Each page can be independently managed as an image processing job by the job manager 46. Thus, decisions regarding delegation to peer devices 16'" can be made at the page level. Moreover, where it may be logical or practical to delegate a group of pages or the remaining pages to the same peer device 16'", the page splitter/combiner 48 may take this into account or may define independent image processing jobs for such groups rather than individual pages. While PostScript is identified as an exemplary language for the rendering job, in other embodiments, other forms of PDL, such as PCL may be the language in which the rendering job is presented to the target device.

Once split, each subordinate image processing job is passed back to the job manager 46 and can then be managed as an independent job. The job manager 46 may notify the queue manager 20 that the original rendering job was split and may identify the resulting subordinate image processing jobs to the queue manager. The subordinate image processing jobs created by the page splitter/combiner 48 may be traceable to the original rendering job by any combination of the queue manager 20, page manager 46, and page splitter/combiner 48. Decisions by the job manager 46 regarding delegation to peer devices 16'" that may be made at the job level are in actuality made at the page level for PostScript jobs due to the page splitter operation.

The job manager 46 is in communication with the queue manager 20 and can determine when a backlog is developing and when it would be more efficient if a given image processing job could be delegated to another device. If such conditions are determined, the job manager 46 notifies the requestor 50 of the image processing job for which it prefers to delegate image processing. Various characteristics and parameters associated with the job may be provided to the requestor 50. The requestor 50 broadcasts a request for image processing associated with the image processing job to peer image processing devices 16'" via the network 18. Various characteristics and parameters associated with the job may be identified in the broadcasted request.

The responder 52 in the peer device 16'" receives the broadcasted request and checks the status of the peer device 16'" by communicating with the queue manager 21. If the peer device 16'" can assign local resources 25 to perform the requested image processing, the responder 52 sends a response indicating such to the requestor 50 and the queue manager 21.

Various characteristics and parameters associated with the peer device 16''' may be included in the response to the requestor 50.

The requestor 50 may evaluate multiple responses and select a peer device 16''' that optimizes throughput/efficiency and/or image processing quality for the target device 14'''. For example, the requestor 50 may ensure that subordinate image processing jobs of an original PostScript rendering job are delegated to peer devices 16''' that provide consistent and compatible image processing. Of course, the requestor 50 may also simply act on the first response to the broadcasted request. Once a peer device 16''' is selected, the requestor 50 communicates the selection to the queue manager 20 and job manager 46. The queue manager 20 may associate the delegated page(s) for the rendering job with the selected peer device 16'''. The job manager 40 passes the image processing job to the selected peer device 16''' via the requester 50 and the network 18 in a data stream. The requestor 50 may compress the data stream to reduce network traffic.

The responder 52 in the selected peer device 16''' receives the job and decompresses the data stream if it was compressed. The responder 52 notifies the queue manager 21 that the image processing job was received and passes the image processing job to the job manager 47. The job manager 47 determines which local resources 25 are required to process the image processing job and routes the image processing job to the appropriate resources. When the image processing job is complete, the job manager 47 sends processed data to the target device 14''' via the responder 52 and network 18 in a data stream. The responder 52 may compress the data stream to reduce network traffic.

The requestor 50 receives the processed job and decompresses the data stream if it was compressed. The requestor 50 notifies the queue manager 20 that the processed data for the image processing job was received and passes the processed data to the job manager 46. The job manager 46 recognizes when the processed data is associated with a subordinate page of an original PostScript rendering job. If the processed data is associated with such a subordinate job, the job manager 46 routes the processed data to the page splitter/combiner 48. When image processing for all the subordinate image processing jobs of an original PostScript rendering job are complete, the page splitter/combiner 48 combines the corresponding processed data together to re-formulate the original rendering job and routes a corresponding processed data stream to the job manager 46. The job manager 46 coordinates the re-formulated PostScript rendering job with other rendering jobs in the target device queue and, at an appropriate time, routes the re-formulated PostScript rendering job to the output controller 28 for rendering by the local rendering resources 30. Of course, if a given processed data stream is not part of an original PostScript rendering job, the job manager 46 merely coordinates the processed data from the peer device 16''' with other rendering jobs in the target device queue and, at an appropriate time, routes the processed rendering job to the output controller 28 for rendering by the local rendering resources 30.

Notably, if the job manager 46 does not attempt to delegate a given image processing job for the PostScript rendering job or if no peer device 16''' responds to the request for image processing assistance on a particular image processing job, the job manager 46 coordinates image processing for the image processing job with other image processing jobs associated with the PostScript rendering job and eventually passes the image processing job or all image processing for the PostScript rendering job to the local resources 24 for processing. The data associated with the PostScript rendering job may be passed back and forth between the job manager 46 and the local resources 24 multiple times as various image processing jobs associated with the PostScript rendering job are performed. When the assigned image processing job is complete, the local resources 24 send the corresponding processed data back to the job manager 46. The combining process described above occurs next if the image processing job was a subordinate job of an original PostScript rendering job. Otherwise, the job manager 46 routes the processed rendering job to the local rendering resources via the output controller 28 as described above.

Figure 6:
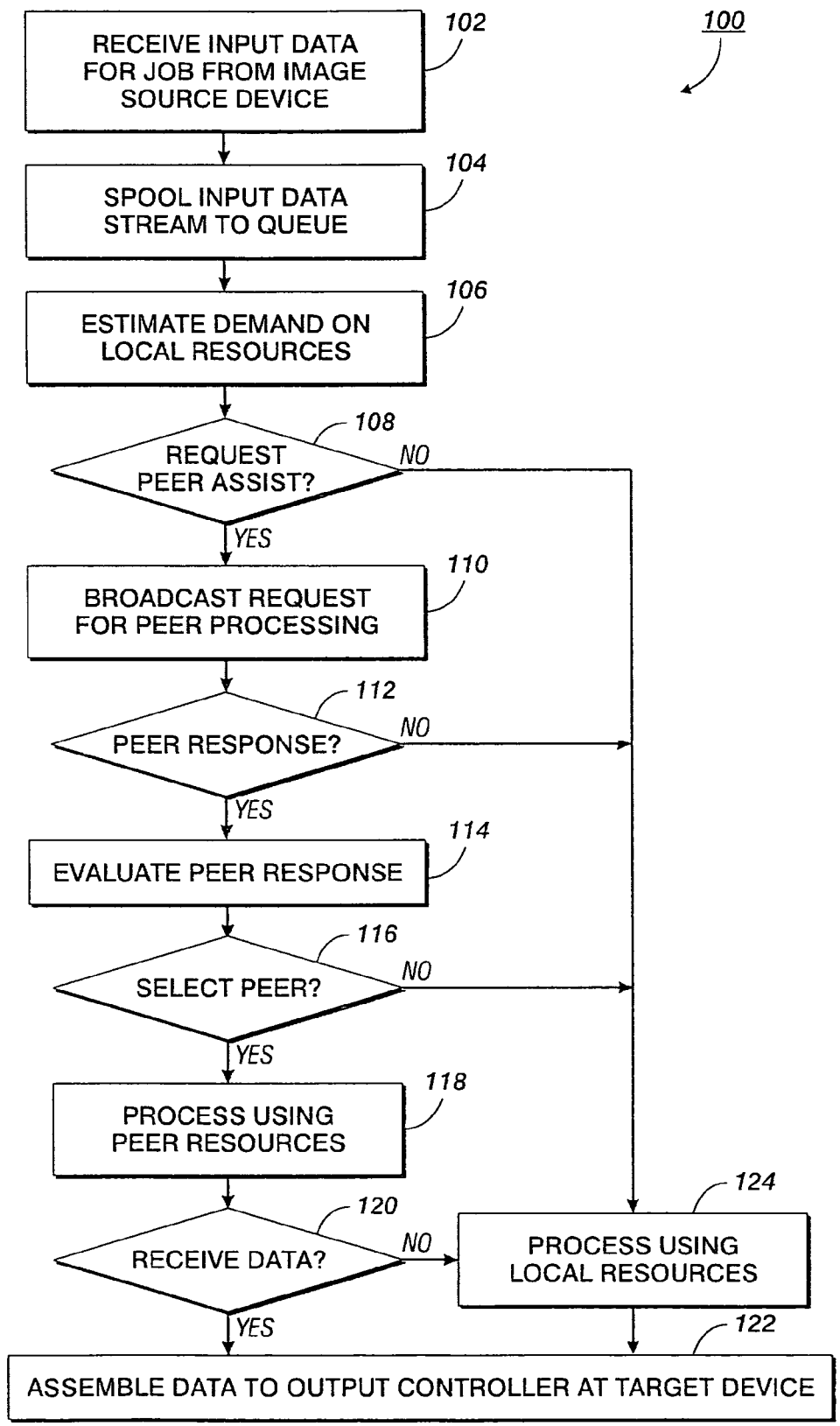
FIG. 6 is a flow chart of an embodiment of a method of processing a job at a target image processing device.

With reference to FIG. 6, a method 100 of processing a job at a target image processing device begins at step 102 where input data for the job is received from an image source device. At step 104, the input data is spooled to a queue associated with the target device. Next, the target device estimates the demand that would be placed on local image processing resources of the target device by the job (step 106). At step 108, the target device determines whether it would be more efficient to receive image processing assistance from a peer image processing device than to use its local image processing resources to process the job. In other words, the target device determines if it should request assistance from a peer device based on estimates of the demand for local image processing resources and projected efficiency.

If the target device determines that it should request image processing assistance, it broadcasts a request for image processing assistance to one or more peer devices via a communication path, such as a communication network (step 110). The request may identify certain characteristics and parameters associated with the job, such as priority, language (e.g., PCL, PostScript), size, and resolution. The request may also identify one or more image processing tasks associated with the job that could be independently accepted. Next, the target device determines if a response was received from at least one peer device within a predetermined time (step 112). The peer device responses may include certain characteristics and parameters associated with the responding peer device, such as CPU type, estimated time to complete, and image processing services available. If any responses were received, the target device evaluates the responses based upon predetermined criteria (step 114). For example, the predetermined criteria may include various parameters influencing efficiency and/or quality in processing and rendering the job.

Next, the target device determines whether or not to select a responding peer device for image processing based upon predetermined criteria (step 116). The predetermined criteria may be based on optimizing efficiency, optimizing quality, or a combination of these factors that produces a suitable level of efficiency and quality in processing and rendering the job. If image processing for the job can be divided, for example, into image processing tasks or pages, the target device may select one or more responding peer devices and then divide the job up accordingly. Similarly, where image processing for the job can be divided into tasks or pages, the method can select a combination of peer devices and local image processing resources of the target device for processing the job. If a responding peer device is selected for image processing, the job is sent to the selected peer device for image processing (step 118). Of course, if any combination of one or more peer devices and local image processing resources of the target device are selected, the job is either split up or sequentially sent to the peer devices and the local image processing resources of the target device.

Next, the target device determines if processed data was received from the selected peer device(s) within a predetermined time (step 120). If processed data was received from the responding peer device(s), the target device assembles the processed data into an appropriate sequence and form for an output controller at the target device (step 122). The target device eventually renders the job downstream from the output controller.

At step 108, if the target device determines that it would not be more efficient to receive image processing assistance from a peer device, it advances to step 124 where image processing is performed using local image processing resources of the target device.

At step 112, if no responses were received from any peer devices within the predetermined time, the target device advances to step 124 where image processing is performed using local image processing resources of the target device.

At step 116, if the target device does not select a responding peer device for assistance with image processing, it advances to step 124 where image processing is performed using local image processing resources of the target device. Additionally, if a combination of one or more peer devices and local image processing resources of the target device are selected for performing the image processing, the target device advances to step 124 where image processing is performed using local image processing resources of the target device at the appropriate time for performance of the corresponding portion of image processing.

At step 120, if processed data was not received from any selected peer device within the predetermined time, the target device advances to step 124 where image processing is performed using local image processing resources of the target device in lieu of image processing by the corresponding selected peer device.

Figure 7:
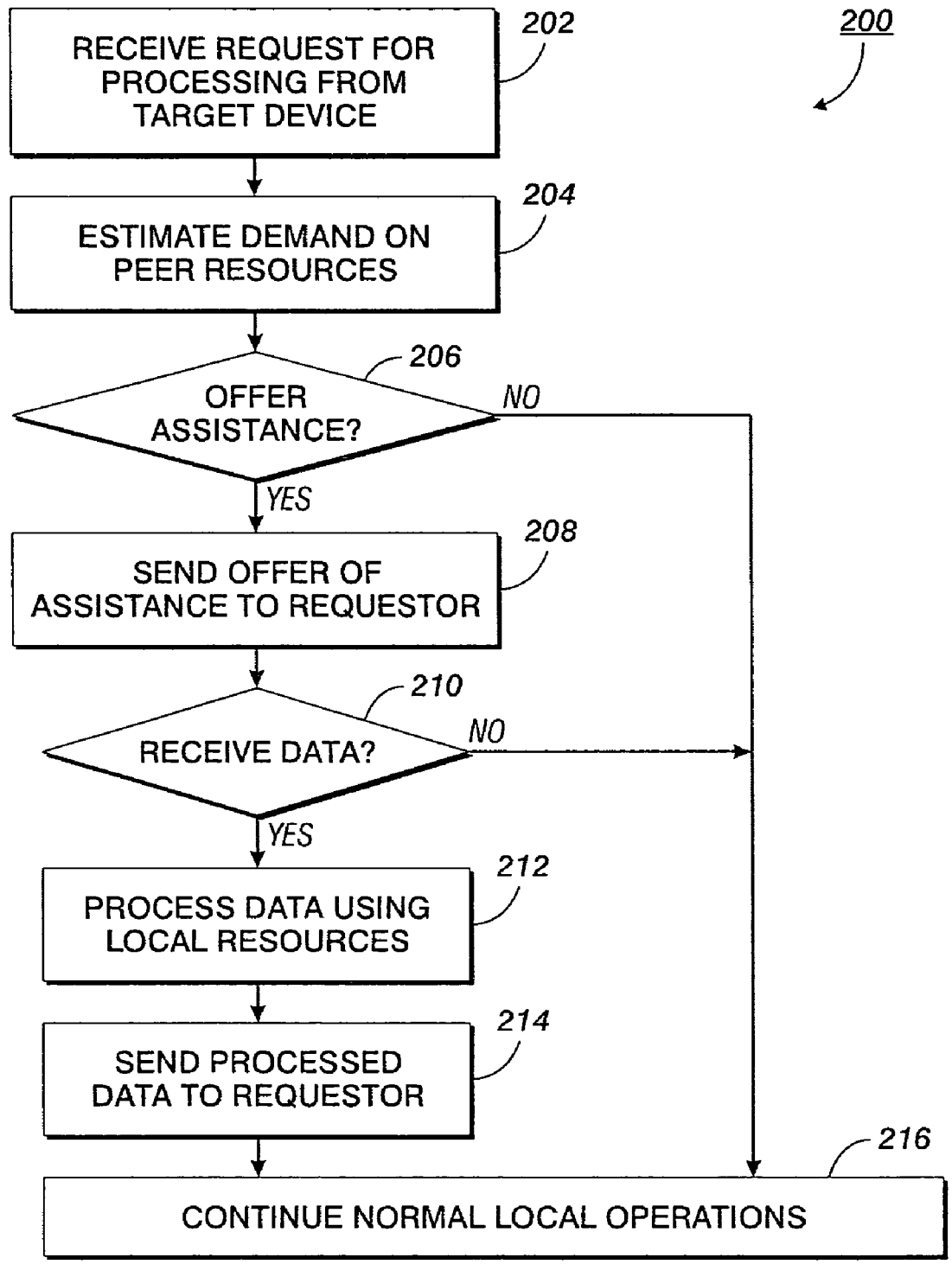
FIG. 7 is a flow chart of an embodiment of a method of processing a job or portion thereof at a peer image processing device.

With reference to FIG. 7, a method 200 for a peer image processing device to provide image processing assistance to a target image processing device for a job originally directed to the target device begins at step 202 where a request for image processing assistance from the target device is received by the peer device. The request may identify certain characteristics and parameters associated with the job, such as priority, language (e.g., PCL, PostScript), size, and resolution. At step 204, the peer device estimates the demand that would be placed on local image processing resources of the peer device by the requested image processing. Next, the peer device determines if it should respond to the request based on predetermined standards for efficiency and/or priority (step 206). For example, the peer device may determine whether providing the requested assistance would cause job throughput for the peer device to backup beyond acceptable limits or whether the job associated with the request has a higher priority than other jobs currently in the peer device's queue.

If the peer device decides to respond to the request, it sends a message to the requestor offering the image processing assistance that was requested (step 208). The message may include certain characteristics and parameters associated with the peer device, such as CPU type, estimated time to complete, and image processing services available. Next, the peer device determines if input data associated with the job is received from the target device within a predetermined time (step 210). For example, the target device may respond to the offer of assistance by sending the corresponding image processing job or a portion thereof to the peer device. If the input data is received, the peer device processes the input data using its local image processing resources (step 212). For example, the peer device places the image processing job in its queue according to a predetermined priority strategy and performs the image processing when the job is next in the queue and the required image processing resources become available. The priority strategy may usually be based on a first in, first out strategy, but may include other factors which advance or delay the queued position of the image processing job outside the normal strategy. At step 214, when the requested image processing is complete, the peer device sends processed data to the target device. Then, the peer device continues normal local image processing operations (step 216).

At step 208, if the peer device does not decide to respond to the request, it advances to step 218 where it continues normal local image processing operations.

At step 210, if input data was not received within the predetermined time, the peer device advances to step 218 where it continues normal local image processing operations.

Figure 8:
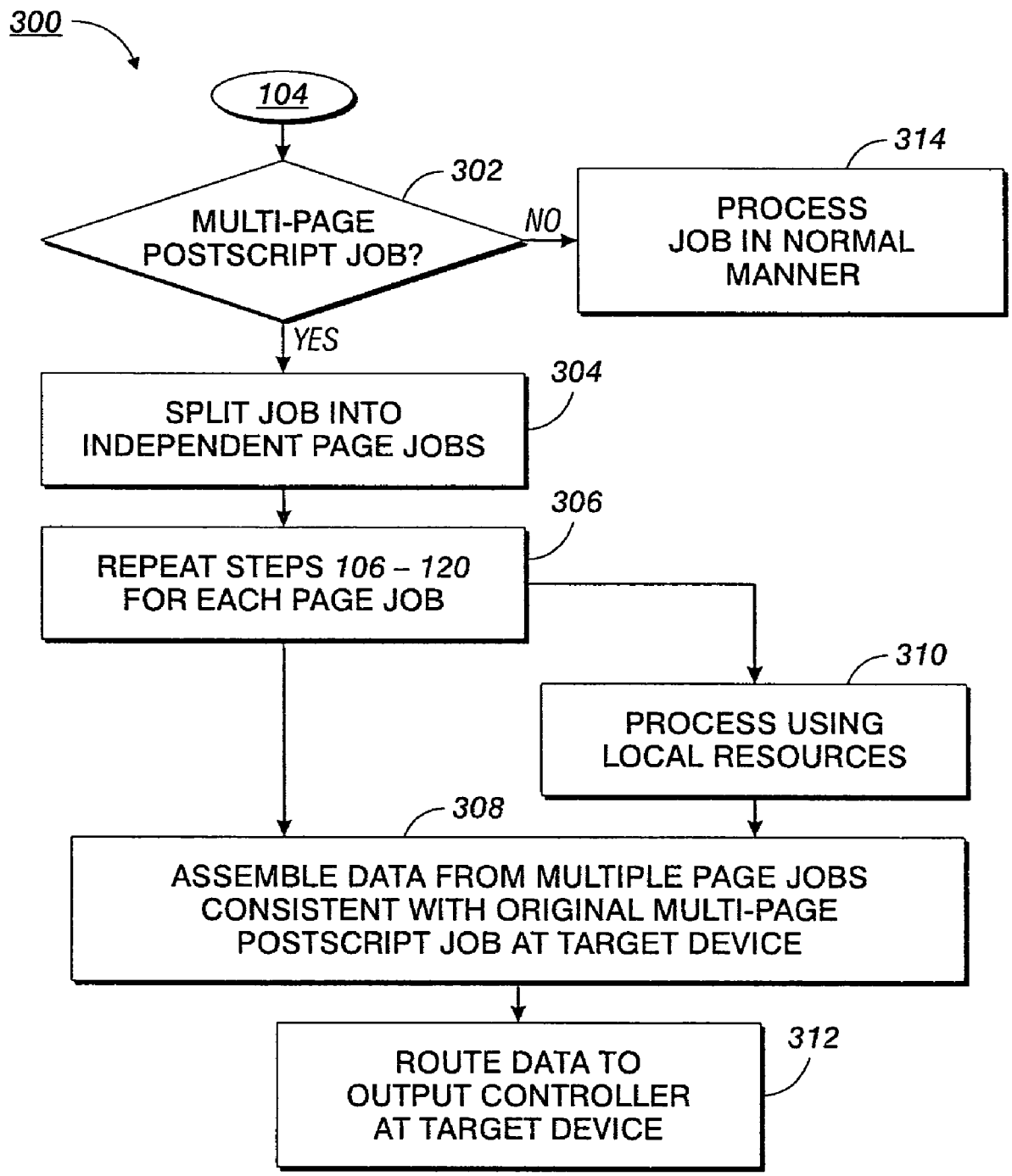
FIG. 8 is a flow chart of another embodiment of a method of processing a job at a target image processing device.

With reference to FIG. 8, another method 300 of processing a job at a target image processing device continues after step 104 of the method 100 of FIG. 6 at step 302 where the target device determines if the job is a multi-page PostScript job. While PostScript is identified as an exemplary language for the rendering job, in other embodiments, other forms of PDL, such as PCL may be the language in which the rendering job is presented to the target device. If the job is a multi-page PostScript job, the target device splits the job into multiple independent page jobs (step 304). Each independent page job may include one or more pages of the original job. Then, steps 106 through 120 of the method 100 of FIG. 6 are repeated for each page job (step 306). If image processing for the corresponding page job was complete and processed data was received from the selected peer device(s) in step 120, the method advances to step 308. Conversely, if the appropriate conditions are not identified to continue with image processing using a peer device at steps 108, 112, 116, or 120, the method advances to step 310 where image processing for the corresponding page job is performed using local image processing resources of the target device. When local image processing for the corresponding page job is complete, the target device advances to step 308.

At step 308, the target device assembles processed data from the selected peer device(s) and/or local image processing resources of the target device for the multiple page jobs in a manner consistent with the original multi-page PostScript job. After the processed data for the multiple page jobs is assembled, the target device routes the assembled data to an output controller at the target device (step 312). The target device eventually renders the job downstream from the output controller.

At step 302, if the job is not a multi-page PostScript job, the target device advances to step 314 where image processing for the job is performed in the normal manner. For example, steps 108 through 124 from the method 100 of FIG. 6 are an example of the normal manner.

The disclosure provided herein references exemplary embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A networked environment for sharing an image processing load for a rendering job, the networked environment including:
   an image source device;
   a first image processing device including a first image processing resource and a first rendering resource, wherein the first image processing device receives a rendering job from the image source device for rendering by the first rendering resource, wherein the rendering job requires image processing prior to such rendering;

a network for data communications; and a second image processing device in communication with the first image processing device via the network, the second image processing device including a second image processing resource and a second rendering resource, wherein the second image processing device is spaced apart from the first image processing device;

wherein at least a portion of the image processing required for the rendering job is performed by the second image processing resource, wherein the first rendering resource renders the rendering job after image processing for the rendering job is complete using data from the second image processing resource.

2. The networked environment set forth in claim 1, the first image processing device further including:

means for sending a request for image processing assistance to at least the second image processing device.

3. The networked environment set forth in claim 2, the second image processing device further including:

means for responding to the request for image processing assistance from the first image processing device with an offer of assistance.

4. The networked environment set forth in claim 3, the second image processing device further including:

means for determining if the offer of assistance should be sent to the first image processing device in response to the request for image processing assistance based at least in part on an image processing load for the second image processing device.

5. The network environment set forth in claim 3, further including:

a third image processing device in communication with the first image processing device via the network, wherein the third image processing device is spaced apart from the first and second image processing devices, wherein the request for image processing assistance is also sent to the third image processing device, the third image processing device including:

a third image processing resource adapted to perform at least a portion of the image processing required for the rendering job and a third rendering resource; and means for responding to the request for image processing assistance from the first image processing device with an offer of assistance.

6. The networked environment set forth in claim 5, the first image processing device further including:

means for evaluating offers of assistance from the second and third image processing devices and selecting at least one of the second and third image processing devices for delegation of at least a portion of the image processing required for the rendering job.

7. The networked environment set forth in claim 1, the first image processing device further including:

means for delegating at least a portion of the image processing required for the rendering job to the second image processing device; and means for sending rendering job data corresponding to the delegated image processing to the second image processing device.

8. The networked environment set forth in claim 7, the second image processing device further including:

means for sending processed data corresponding to the delegated image processing to the first image processing device after the delegated image processing by the second image processing resource is complete.

9. The networked environment set forth in claim 1, the first image processing device further including:

means for determining if it would be more efficient if at least a portion of the image processing required for the rendering job were delegated to another image processing device based at least in part on an image processing load for the first image processing device.

10. The networked environment set forth in claim 1, wherein the printer description language for the rendering job is PostScript and the rendering job is a document with multiple pages, the first image processing device further including:

means for decomposing the image processing required for the rendering job into a series of individual PostScript image processing jobs corresponding to multiple pages of the document; and means for assembling processed data from each PostScript image processing job associated with the rendering job so that the rendering job is rendered with each page of the document in proper sequence.

11. A method of sharing an image processing load for a rendering job in a networked environment, the method including:

a) providing an image source device, a first image processing device, and a second image processing device, the first image processing device including a first image processing resource and a first rendering resource, the second image processing device including a second image processing resource and a second rendering resource, wherein the second image processing device is spaced apart from the first image processing device, wherein the image source device is in communication with at least the first image processing device, wherein at least the first and second image processing devices are in communication via a network;

b) receiving a rendering job at the first image processing device from the image source device for rendering by the first rendering resource, wherein the rendering job requires image processing prior to such rendering;

c) performing at least a portion of the image processing required for the rendering job at the second image processing resource; and d) rendering the rendering job at the first rendering resource after image processing for the rendering job is complete using data from the second image processing resource.

12. The method set forth in claim 11, further including:

e) sending a request for image processing assistance from the first image processing device to at least the second image processing device.

13. The method set forth in claim 12, further including:

f) at the second image processing device, responding to the request from the first image processing device with an offer of assistance.

14. The method set forth in claim 13, further including:

g) at the second image processing device, determining if the offer of assistance should be sent to the first image processing device in response to the request for image processing assistance based at least in part on an image processing load for the second image processing device.

15. The method set forth in claim 13, further including:

g) providing a third image processing device in communication with the first image processing device via the network, the third image processing device including a third image processing resource adapted to perform at least a portion of the image processing required for the rendering job and a third rendering resource, wherein the third image processing device is spaced apart from the first and second image processing devices, wherein the request for image processing assistance in e) is also sent to the third image processing device; and h) at the third image processing device, responding to the request for image processing assistance from the first image processing device with an offer of assistance.

16. The method set forth in claim 15, further including:

i) at the first image processing device, evaluating the offers of assistance from the second and third image processing devices; and j) at the first image processing device, selecting at least one of the second and third image processing devices for delegation of at least a portion of the image processing required for the rendering job.

17. The method set forth in claim 11, further including:

e) at the first image processing device, delegating at least a portion of the image processing required for the rendering job to the second image processing device; and f) at the first image processing device, sending rendering job data corresponding to the delegated image processing to the second image processing device.

18. The method set forth in claim 17, further including:

g) at the second image processing resource, sending processed data corresponding to the delegated image processing to the first image processing device after the delegated image processing by the second image processing resource is complete.

19. The method set forth in claim 11, the first image processing device further including:

e) at the first image processing device, determining if it would be more efficient if at least a portion of the image processing required for the rendering job were delegated to another image processing device based at least in part on an image processing load for the first image processing device.

20. The method set forth in claim 11, wherein the printer description language for the rendering job is PostScript and the rendering job is a document with multiple pages, the method further including:

e) at the first image processing device, decomposing the image processing required for the rendering job into a series of individual PostScript image processing jobs corresponding to multiple pages of the document; and f) at the first image processing device, assembling processed data from each PostScript image processing job associated with the rendering job so that the rendering job is rendered with each page of the document in proper sequence.

21. A networked environment for sharing an image processing load for a rendering job on a xerographic rendering resource, the networked environment including:

an image source device;

a first image processing device with a first image processing resource and a first xerographic rendering resource, wherein the first image processing device receives a rendering job from the image source device for rendering by the first xerographic rendering resource, wherein the rendering job requires image processing prior to such rendering;

a network for data communications; and a second image processing device in communication with the first image processing device via the network, the second image processing device including a second image processing resource and a second xerographic rendering resource, wherein the second image processing device is spaced apart from the first image processing device;

wherein at least a portion of the image processing required for the rendering job is performed by the second image processing resource, wherein the first xerographic rendering resource renders the rendering job after image processing for the rendering job is complete using data from the second image processing resource.

* * * * *